United States Patent
Hojsgaard et al.

(10) Patent No.: US 9,527,760 B2
(45) Date of Patent: Dec. 27, 2016

(54) ENERGY EFFICIENT SYSTEM AND PROCESS FOR TREATING SLUDGE

(71) Applicants: Soeren J. Hojsgaard, Hillerod (DK); Lars Rohold, Odense (DK)

(72) Inventors: Soeren J. Hojsgaard, Hillerod (DK); Lars Rohold, Odense (DK)

(73) Assignee: Veolia Water Solutions & Technologies Support, Saint-Maurice (FR)

( * ) Notice: Subject to any disclaimer, the term of this patent is extended or adjusted under 35 U.S.C. 154(b) by 502 days.

(21) Appl. No.: 13/791,919

(22) Filed: Mar. 9, 2013

(65) Prior Publication Data

US 2014/0251901 A1    Sep. 11, 2014

(51) Int. Cl.
F28F 1/00    (2006.01)
C02F 1/02    (2006.01)
(Continued)

(52) U.S. Cl.
CPC ............... *C02F 11/04* (2013.01); *C02F 11/18* (2013.01); *F23G 7/001* (2013.01); *C02F 1/008* (2013.01);
(Continued)

(58) Field of Classification Search
CPC ........... C02F 11/04; C02F 11/18; C02F 1/025; C02F 3/1221; C02F 9/00; F28D 7/16; F28D 2265/06; F28D 9/02
(Continued)

(56) References Cited

U.S. PATENT DOCUMENTS 6,051,145 A    4/2000    Griffith et al.
6,730,215 B2   5/2004    Shiota et al.
(Continued)

FOREIGN PATENT DOCUMENTS

JP    H0240300 A     2/1990
JP    2000126798 A   5/2000
(Continued)

OTHER PUBLICATIONS

Evans, Francis L., "Heat Treatment/Low Pressure Oxidation Systems: Design and Operational Considerations", Office of Municipal Pollution Control, Office of Water, U.S. Environmental Protection Agency, 52 pages (Sep. 1985).

*Primary Examiner* — Nam Nguyen
*Assistant Examiner* — Claire Norris
(74) *Attorney, Agent, or Firm* — Coats and Bennett PLLC

(57) ABSTRACT

Apparatus and process is provided for hydrolyzing sludge from water treatment and for conditioning the hydrolyzed sludge for optimal anaerobic digestion. Methods provided include dewatering to produce dewatered sludge, hydrolyzing the dewatered sludge in a steam fed process, preheating the dewatered sludge before hydrolysis with sludge-to-sludge heat transfer, and cooling and diluting the sludge using sludge-to-water heat transfer and water injection, and anaerobically digesting the hydrolyzed sludge. Apparatus provided includes a generally vertically oriented counter-flow sludge-to-sludge heat exchanger, a hydrolysis reactor and associated source of steam, sludge-to-water heat exchangers, and a dilution unit. Temperature and pressure sensors are configured to command various variable flow pumps and valves for controlling the process.

23 Claims, 6 Drawing Sheets

(51) Int. Cl.
  *C02F 9/00* (2006.01)
  *C02F 3/28* (2006.01)
  *C02F 11/04* (2006.01)
  *C02F 11/18* (2006.01)
  *F23G 7/00* (2006.01)
  *C02F 1/00* (2006.01)
  *C02F 11/12* (2006.01)

(52) U.S. Cl.
  CPC .......... *C02F 11/12* (2013.01); *C02F 2209/006* (2013.01); *C02F 2209/02* (2013.01); *C02F 2209/03* (2013.01); *C02F 2209/10* (2013.01); *F23G 2900/50208* (2013.01)

(58) Field of Classification Search
  USPC ............ 210/609, 613, 175, 766, 195.1, 601, 907,210/765, 774; 165/158, 71
  See application file for complete search history.

(56) References Cited

U.S. PATENT DOCUMENTS

| | | | |
|---|---|---|---|
| 7,377,307 B1 * | 5/2008 | Ijiri et al. | 165/134.1 |
| 2003/0121851 A1 * | 7/2003 | Lee, Jr. | 210/603 |
| 2006/0275895 A1 * | 12/2006 | Jensen et al. | 435/300.1 |
| 2011/0114570 A1 | 5/2011 | Hojsgaard | |

FOREIGN PATENT DOCUMENTS

| | | |
|---|---|---|
| JP | 2005254165 A | 9/2005 |
| JP | 2007021300 | 1/2007 |
| JP | 2008036560 | 2/2008 |
| JP | 2009101293 | 5/2009 |
| KR | 1020060011008 | 6/2007 |
| KR | 1020107007627 | 5/2012 |
| KR | 1020090100046 | 8/2012 |

* cited by examiner

ENERGY EFFICIENT SYSTEM AND PROCESS FOR TREATING SLUDGE

FIELD OF THE INVENTION

The present invention relates to systems and processes for treating sludge, and more particularly, to a system and process where dewatered sludge is directed through a hydrolysis reactor and thereafter to an anaerobic digester, and wherein the system and process are designed for energy efficiency.

BACKGROUND

Anaerobic digestion is an energy conversion process that can produce biogas from the solid matter in sludge and reduce waste discharge. Biogas may be used for energy demands in an overall sludge processing or wastewater treatment system or in other areas. Digestion of sludge anaerobically occurs due to organisms present in the sludge and is known to occur in at least two general temperature regimes. At temperatures of about 32°-38° C., mesophilic organisms are active and contribute to digestion, while at temperatures of 50°-60° C. thermophilic organisms function to digest the sludge. Depending on the type of sludge being processed different population profiles of organisms may be involved, and anaerobic digestion is generally operated in a range consistent with the type of sludge and the organism profile in the sludge. Typically, it is desired to operate the anaerobic digester in the range of 30°-60° C. In order to compensate for heat loss from the digester and to assure that the operating temperature in the digester remains in the desired range, it is known to supply in feed sludge to the digester at a temperature that is approximately 1-10° C. above the desired anaerobic digester operation temperature. Also, an optimal dry solids concentration for anaerobic digestion of sludge is about 3%-10% dry solids concentration.

In preparing raw sludge for anaerobic digestion, it is known to subject the sludge to hydrolysis. Hydrolysis increases the biodegradability of the organic matter in the sludge, which increases biogas production and reduces waste output from anaerobic digestion. Hydrolysis of sludge takes place in temperature and pressure ranges of 150°-170° C. and 6-12 bar, respectively. It is preferable to dewater sludge to about 20%-30% by weight dry solids before feeding the sludge into a hydrolysis reactor in order to minimize reactor volume and energy consumption.

Temperature and pressure in the desired ranges for hydrolysis of sludge is typically created by injecting steam with the sludge into the hydrolysis reactor. Steam injection is a highly energy intensive aspect of sludge hydrolysis and waste energy recovery is a matter of significant concern relative to sludge hydrolysis. In some instances, it is known to partly recover energy by flashing off the steam into the incoming sludge in a batch hydrolysis process or by heating boiler feed water for the production of new steam. These processes are characterized by less than desirable efficiency and very high cost.

There continues to be a need to improve the energy efficiency of sludge treatment systems that include processes for hydrolyzing sludge and thereafter anaerobically digesting the sludge.

SUMMARY

The present invention provides a system and process for hydrolyzing sludge and anaerobically digesting the hydrolyzed sludge in a manner that is energy efficient.

In one embodiment, the present invention comprises directing dewatered sludge to a generally vertically or slightly inclined oriented heat exchanger where the heat exchanger includes a sludge inlet located at a lower portion of the heat exchanger and a sludge outlet located at an upper portion of the heat exchanger. The heat exchanger further includes a hydrolyzed sludge inlet located at an upper portion of the heat exchanger and a hydrolyzed sludge outlet placed at a lower portion of the heat exchanger. The method or process includes directing sludge upwardly through the heat exchanger while directing hydrolyzed sludge downwardly through the heat exchanger to provide sludge-to-sludge heat transfer where the hydrolyzed sludge effectively heats the incoming or dewatered sludge. The hydrolyzed sludge exiting the heat exchanger is directed to an anaerobic digester. Prior to reaching the anaerobic digester, the hydrolyzed sludge is conditioned by adjusting its temperature and dry solids content.

In another embodiment of the present invention, a method for treating sludge includes directing dewatered sludge to a hydrolysis reactor and hydrolyzing the dewatered sludge. The hydrolyzed sludge is directed to an anaerobic digester where the sludge is anaerobically digested. A heat exchanger is disposed on the outlet side of the hydrolysis reactor and is used for heating dewatered sludge prior to the dewatered sludge entering the hydrolysis reactor. The heat exchanger provides for sludge-to-sludge heat transfer between the hydrolyzed sludge and the dewatered sludge. The method entails varying the flow of dewatered sludge through the heat exchanger during a certain period of sludge treatment. During a start-up mode, for example, the method includes directing a majority of the dewatered sludge through a heat exchanger bypass line and to the hydrolysis reactor, and during a steady state mode, directing at least a part of the dewatered sludge through the heat exchanger and then to the hydrolysis reactor.

Other objects and advantages of the present invention will become apparent and obvious from a study of the following description and the accompanying drawings which are merely illustrative of such invention.

DETAILED DESCRIPTION

Figure 1:
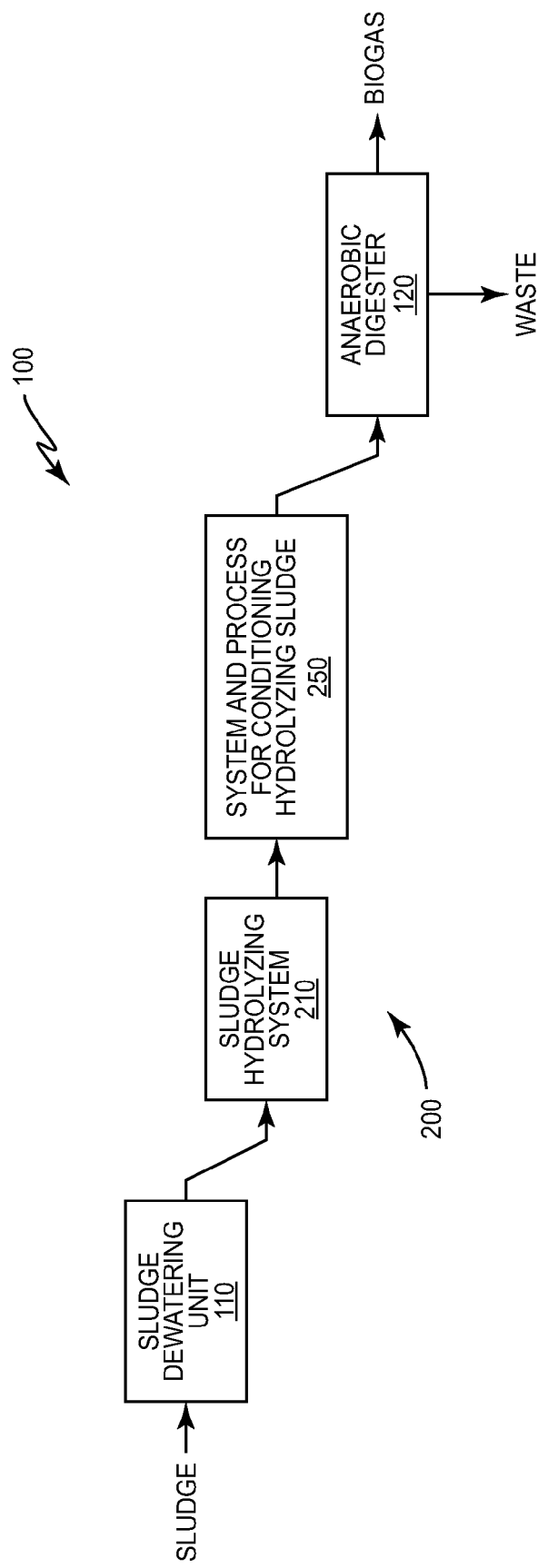
FIG. 1 is an overall schematic representation of a sludge hydrolysis and conditioning system for anaerobic digestion.
Figure 2:
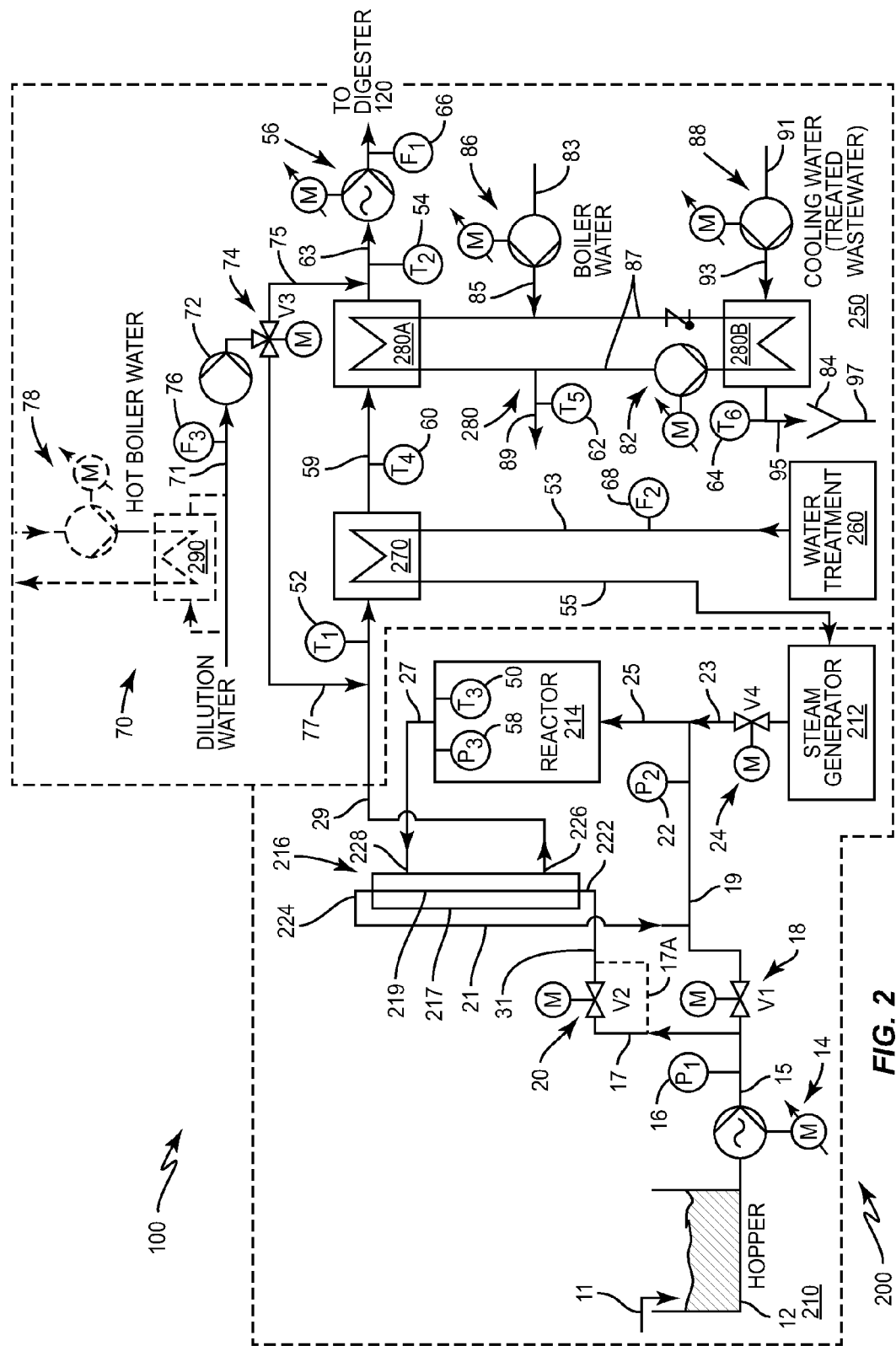
FIG. 2 is a schematic representation of the sludge hydrolysis and conditioning system for anaerobic digestion.

The present invention entails a system and process for treating sludge. The system is shown in FIGS. 1 and 2 and generally indicated by the numeral 100. System 100 receives raw sludge and produces biogas and a waste stream. In particular, system 100 includes a dewatering unit 110 for dewatering sludge wherein the dry solids, DSIN, in the sludge is increased to about 20%-30% by weight. Further, the system 100 includes a subsystem generally referred to by the numeral 200. Subsystem 200 includes a sludge hydrolyzing system 210 and a system and process for conditioning the hydrolyzed sludge, referred to by the numeral 250. The hydrolysis process includes heating the sludge to within a range of about 140—to about 165° C. in a hydrolysis reactor shown in FIG. 2 and referred to by the numeral 214. In one embodiment, the pressure in reactor 214 is maintained at about 8 bars depending on the process temperature. This supports hydrolysis of the sludge and results in the reduction of dry solids concentration in the sludge. After the sludge has been subjected to the hydrolysis process, the sludge is directed to an anaerobic digester 120. However, prior to reaching the anaerobic digester, the hydrolyzed sludge is subjected to conditioning. An objective of the conditioning is to optimize the anaerobic digestion process that takes place in anaerobic digester 120. Thus, as will be appreciated from subsequent portions of the disclosure, the conditioning system and process mainly entails appropriately adjusting the temperature of the hydrolyzed sludge as well as the dry solids concentration of the hydrolyzed sludge. Temperature adjustment may be achieved by a series of heat exchangers and the dry solids concentration is adjusted by injecting dilution water into the hydrolyzed sludge. Typically in the conditioning process, the temperature of the hydrolyzed sludge is reduced to about 40° C. and the dry solids concentration of the sludge is reduced such that the dry solids concentration of the sludge being directed to digester 120, DSOUT is about 6%-14% by weight. The conditioned hydrolyzed sludge is directed to the anaerobic digester 120 where mesophilic and/or thermophilic organisms further break down and convert the solids to produce biogas and a waste stream. It is appreciated that controlling the temperature at which the hydrolyzed sludge enters anaerobic digester 120 provides compensation for digester heat loss so that the digester operates in an optimal temperature range of about 30° to 60° C., depending on whether the digester is operating under mesophilic conditions or thermophilic conditions. Adjusting the dry solids concentration to about 6%-14% by weight also tends to support efficient and effective anaerobic digestion.

Considering more particularly sub-system 200, as illustrated in FIG. 2, the sub-system receives dewatered sludge via line 11 through hopper 12, which may be part of dewatering unit 110, the functioning of which is familiar to those of ordinary skill in the art of waste treatment and sludge handling. After a startup period, a variable flow positive displacement sludge pump 14 supplies dewatered sludge, generally continuously, via line 15 to hydrolysis reactor 214. In one mode of operation after the startup period, dewatered sludge is directed via a bypass variable flow control valve 18 into line 19, and thence through line 25 into the hydrolysis reactor 214. Associated with the hydrolysis reactor 214 is a steam generator 212. Steam generator 212 is operative to continually direct steam through a valve (V4) 24 and lines 23 and 25 into the hydrolysis reactor 214 during the hydrolysis process. It is appreciated, however, that steam can be supplied alternatively from an outside source. However, it may be advantageous to employ steam generator 212, using energy from biogas generated by digester 120, in which case it may be possible to reduce energy consumption typically about 10% by heat recovery from sludge to water for steam using heat exchanger 270. Hot, hydrolyzed sludge is directed via line 27 to a hydrolyzed sludge inlet 228 of a heat exchanger 216 and thence generally downwardly through the heat exchanger to a hydrolyzed sludge outlet 226 thereof and thence via line 29 to various portions in the overall system, including where the hydrolyzed sludge is conditioned for appropriate treatment in the anaerobic digester.

In another mode of operation, dewatered sludge is directed via line 17 into a variable flow control valve 20 and thence via line 31 to a dewatered sludge inlet 222 of the heat exchanger 216. In some embodiments, valve 20 may be omitted as indicated by dotted line 17A. The dewatered sludge is directed generally upwardly within heat exchanger 216 towards a dewatered sludge outlet 224 and thence via line 21 to line 19 and through line 25 to hydrolysis reactor 214.

It is appreciated that directing at least a portion of the dewatered sludge through heat exchanger 216 may serve both to aid in cooling the hydrolyzed sludge and to recover a portion of the energy added during hydrolysis. At least a portion of the hydrolyzed sludge is partially cooled in heat exchanger 216 by incoming dewatered sludge, and the recovered heat warms the incoming sludge before the sludge is directed to reactor 214. This "sludge-to-sludge" heat exchange approach may reduce the energy required for steam production and thereby the cost of hydrolysis and sludge conditioning for anaerobic digestion.

Figure 3:
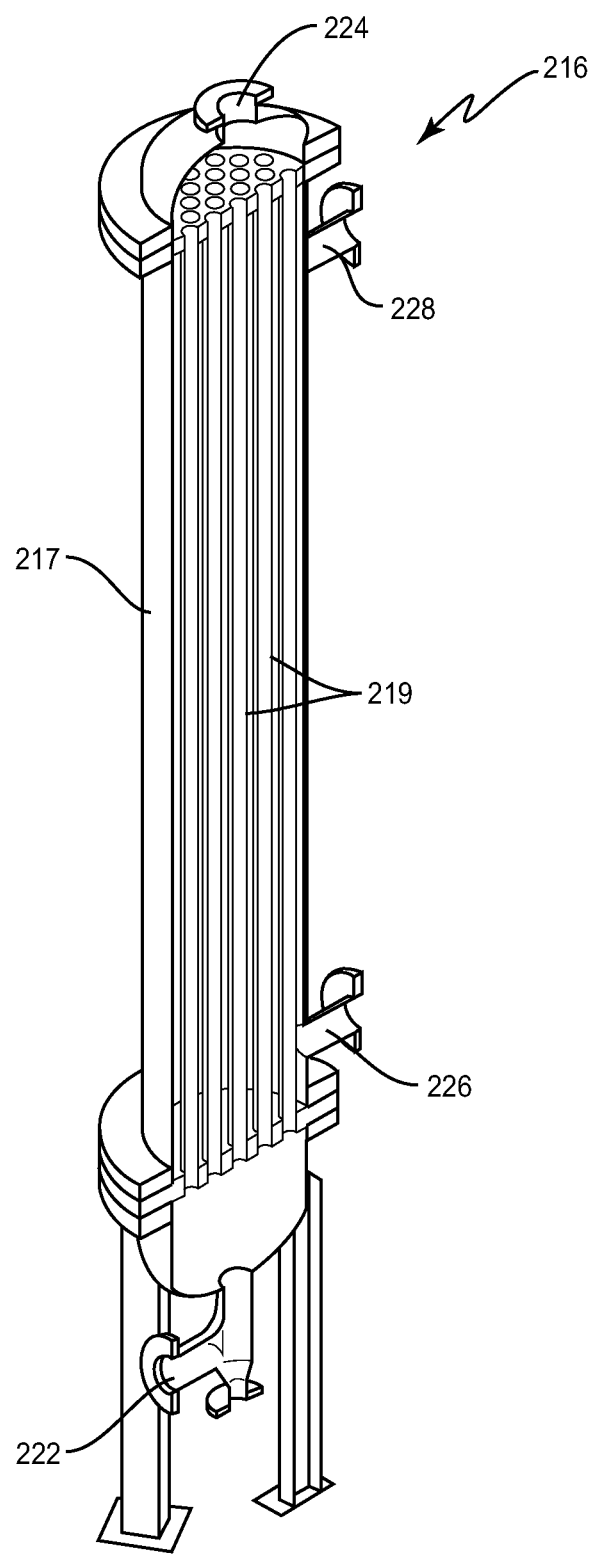
FIG. 3 is a sectional view of a sludge-to-sludge heat exchanger for the sludge hydrolysis and conditioning system for anaerobic digestion.

Heat exchanger 216 is operated as a counter-flow heat exchanger. See FIG. 3. This means that the two fluids, incoming dewatered sludge and hot hydrolyzed sludge, flow through heat exchanger 216 in generally opposed directions. In the present case, hot hydrolyzed sludge from hydrolysis reactor 214 flows downwardly through heat exchanger 216 and transfers heat to the incoming dewatered sludge, which flows upwardly through the heat exchanger. In one embodiment, heat exchanger 216 is a tube-in-shell heat exchanger as illustrated in FIG. 3. Heat exchanger 216, in this embodiment, comprises a vertically oriented, elongated tubular shell 217 wherein hydrolyzed sludge inlet 228 is configured to receive the sludge from reactor 214 and direct the sludge into shell 217 of the heat exchanger. Hydrolyzed sludge outlet 226 is configured to receive hydrolyzed sludge having flowed generally downwardly thereto and discharge the partially cooled hydrolyzed sludge. Further included in heat exchanger 216 are one or more generally parallel tubes 219 disposed within, and generally parallel with, shell 217 such that the tubes extend generally from lower to upper portions of the heat exchanger. Each tube 219 has opposite ends that are in fluid communication, respectively with dewatered sludge inlet 222 and dewatered sludge outlet 224 of heat exchanger 216. Dewatered sludge inlet 222 is configured to receive incoming dewatered sludge and to direct the sludge into lower ends of tubes 219. Dewatered sludge outlet 224 is configured to receive warmed dewatered sludge from upper ends of tubes 219 and to discharge the sludge towards reactor 214. In some embodiments, heat exchanger 216 may be at least slightly inclined from vertical orientation to enhance heat transfer between raw sludge close to tube surfaces and warm sludge between stub surfaces. It has been observed that in some cases vertical orientation of heat exchanged 216 can result in boundary layer formation about tubes 291. The boundary layers about tubes 219 tend to isolate the tubes from hotter hydrolyzed sludge between the tubes. Tilting heat exchanger 216 promotes mixing of the hydrolyzed sludge outside tubes 219, generally preventing the formation of boundary layers about the tubes and improving the heat transfer from the hydrolyzed sludge through the tube walls to the colder dewatered sludge flowing generally upward within the tubes. It has further been observed that the angle of tilt relative to vertical may advantageously be as much as about 15°.

Heat exchanger 216 is, as described above, oriented generally vertically such that the hot hydrolyzed sludge from reactor 214 flows generally downwardly in the heat exchanger while the cooler dewatered sludge from hopper 12 is pumped generally upwardly through the heat exchanger. Thus, incoming dewatered sludge enters heat exchanger 216 at the bottom thereof, flows generally upwardly, and encounters hot hydrolyzed sludge that is fed into the top of the heat exchanger and flows generally downwardly therein. This arrangement tends to ensure that any particulate matter in the hot hydrolyzed sludge is carried to a lower portion of heat exchanger shell 217. The density of the hydrolyzed sludge may also change while the sludge is in heat exchanger 216 due, at least in part, to cooling of the hydrolyzed sludge as it gives up heat to the dewatered raw sludge. A hydrolyzed sludge density increase of about 4%-8% may be observed and may create an increasing gravity profile from top to bottom in heat exchanger 216. This gravity profile may also improve the heat transfer between the hot hydrolyzed sludge and the incoming dewatered sludge.

It is observed that the pressures required for effective operation of reactor 214 make it desirable to have a way of protecting the reactor, and indeed, the entire system, from pressure surges typical of the use of positive displacement pumps such as pumps 14 and 56 in particular. Reactor 214 includes an air pocket or section located in a top portion of the reactor which serves as a compressive means for absorbing or damping shocks that can result from pressure surges.

The hydrolysis process involves breaking down long chain molecules into smaller molecules, resulting in the evolution of a variety of non-condensable gases such as carbon dioxide and nitrogen. These gases take up volume in reactor 214 which can reduce the effective residence time for sludge on the reactor, and the gases reduce heat exchange efficiency in the system. Removal of these non-condensable gases may aid in efficient operation of the system. Accordingly, the present invention includes the capacity to vent reactor 214 to liberate said gases.

In order to facilitate control of system 100, and in particular of sub-system 200, several sensors are deployed therein. Pressure sensor 16 is installed in line 15 to sense the pressure, P1, of the incoming dewatered sludge. Pressure sensor 22 is installed in line 19 to sense the pressure, P2, of sludge entering hydrolysis reactor 214. It is appreciated that the pressure difference, $\Delta P=P1-P2$, generally represents pressure loss in tubes 219 of heat exchanger 216. In some embodiments, this pressure difference is responsible for proportioning the flow of raw, dewatered sludge between a flow path that bypasses heat exchanger 216 and a flow path through the heat exchanger in route to hydrolysis reactor 214.

Pressure sensor 58 and temperature sensor 50 are deployed in reactor 214 to sense the pressure, P3, and temperature, T3, of the reactor during operation. The pressure, P3, in reactor 214 is maintained at a desired set point level by control of pump 56 based on a pressure set point wherein the pumping rate may be adjusted to maintain system pressure and thus the pressure in the reactor. The pressure set point for P3 may be calculated from the reactor temperature to prevent boiling. A required safety margin is added to the calculated boiling pressure to produce the set point for the pressure in reactor 214. Steam delivery by steam generator 212 into line 25 is controlled based on T3 by valve 24.

Turning now to sludge conditioning system 250, the system may include a heat exchanger 270 for pre-heating feed water for steam generator 212 as described below. When present, heat exchanger 270 may also serve to cool the hot hydrolyzed sludge supplied from hydrolysis reactor 214 via line 29. Hydrolyzed and partially-cooled sludge is directed from heat exchanger 270 via line 59 to a sludge cooling heat exchanger unit 280, which may in one embodiment be a pressurized loop boiler feed water heat exchanger unit. Hydrolyzed sludge is directed from heat exchanger unit 280 via line 63 to a variable flow, positive displacement pump 56, back pressure from which may be modulated to maintain system pressure and thus the pressure in reactor 214. At the same time pump 56 delivers the hot hydrolyzed sludge to anaerobic digester 120. (See FIG. 1.)

Further included in conditioning system 250 is a dilution unit 70. Dilution unit 70 receives dilution water, in one embodiment from an external source, via line 71 and pump 72. Dilution is a means for reducing dry solids concentration in the sludge as required by digester 120. Typically, received dilution water may be pasteurized treated wastewater, which is generally substantially cooler than the sludge. Therefore, when dilution water is added, it not only reduces solids concentration in the sludge but may also reduce the temperature of the hydrolyzed sludge. Dilution water from pump 72 is directed to a three way flow control valve 74, which may partition the dilution water flow between lines 75 and 77. Flows through the lines 75 and 77—and thereby the partitioning by means of control valve 74—are in each case chosen to fulfill the temperature setpoints of the sensors 52 and 54. It is appreciated, then, that dilution unit 70 may serve both to adjust the temperature of the hydrolyzed sludge during passage as well as to adjust the percentage of dry solids therein. In some embodiments, the hydrolyzed sludge may be heated by heating dilution water prior to directing the dilution water into the sludge. For example, heating the dilution water using boiler water supplied to heat exchanger 290 may be undertaken during a reactor startup phase. For such embodiments, the dilution water is directed through heat exchanger 290 and heated by boiler water supplied via pump 78 prior to being directed into the sludge. In such embodiments, valve 20 may be omitted thus permitting generally continuous flow of dewatered sludge through heat exchanger 216. In such embodiments, generally continuous flow of dewatered sludge through heat exchanger 216 may result in overcooling the hydrolyzed sludge entering line 29, and the injection of heated dilution water provides for further heating of the hydrolyzed sludge as needed.

As discussed above, dilution water may be added to adjust the dry solids content of the heated hydrolyzed sludge to a level desired for anaerobic digestion. As also discussed above, generally, the addition of dilution water may serve to further cool or heat the heated hydrolyzed sludge. Under some conditions, for example, the dilution water is quite cold. In these situations it is also common that the dewatered sludge is likewise quite cold. Under these conditions, as discussed above, incoming dewatered sludge may, for at least a period during startup, be bypassed around heat exchanger 216 to prevent overcooling the heated hydrolyzed sludge being discharged from reactor 214. An embodiment of the present invention may address such startup situations by heating the dilution water, as described above, so that dilution water injection can increase the temperature of the hydrolyzed sludge. This can allow reducing the amount of dewatered sludge that bypasses heat exchanger 216, thereby permitting the reduction of the steam requirement from steam generator 212 at the cost of some overcooling of the hydrolyzed sludge in passage through heat exchanger 216. This overcooling may be compensated for by the injection of the heated dilution water into the hydrolyzed sludge flowing from heat exchanger 216. In startup conditions, this feature may be advantageous even though some transient over-dilution of the hydrolyzed sludge entering digester 120 may result. Such transient over-dilution may be acceptable due to a lower cost for heating dilution water as compared to the cost of steam generation. However, in situations where ambient dilution water and/or dewatered sludge temperatures may be sufficiently warm, startup processes may be effectively carried out by selective bypassing of dewatered sludge around heat exchanger 216.

As discussed above, heat exchanger 270, when used, pre-heats feed water for steam generator 212. A water treatment unit 260 may be included for treating water to serve as the feed water for steam generator 212. Water, which may be supplied from an outside source to water treatment unit 260, is treated to render the water suitable for use in steam generator 212. Water may be directed to steam generator 212 via line 53, heat exchanger 270, and line 55. It is appreciated that in pre-heating feed water for steam generator 212, heat exchanger 270 may also cool the hot hydrolyzed sludge being supplied from reactor 214. As noted above, system 100 may be operated without steam generator 212 and heat exchanger 270 when it is elected to use an alternative source of steam.

Heat exchanger unit 280 includes, in one embodiment, a first heat exchanger 280A and a second heat exchanger 280B. Heat exchangers 280A and 280B are interconnected by loop 87 wherein water is circulated by variable flow pump 82. This arrangement is sometimes referred to as a pressurized loop heat exchanger. It is appreciated that heat exchanger 280A functions to cool, as needed, the hydrolyzed sludge. The temperature of the water in loop 87 may be modulated to provide desired cooling of hydrolyzed sludge passing through exchanger 280A. The temperature of the loop 87 water may be modulated by heating treated wastewater in heat exchanger 280B. The treated wastewater is heated and the loop 87 water is cooled in heat exchanger 280B. See FIG. 2. Treated wastewater may be admitted to heat exchanger 280B via line 91, through variable flow pump 88, and thence through line 93. Treated waste water from exchanger 280B may be directed via line 95 to a drain 84. It is appreciated that the temperature of the treated wastewater being discharged from the heat exchanger is kept below a certain maximum temperature (for instance, about 45° C.) in order to prevent scaling. Loop 87 water is cooled in exchanger 280B, and the loop water is circulated between the exchanger and heat exchanger 280A to cool the hydrolyzed sludge. In one embodiment, loop 87 water temperature may be modulated by injecting boiler water into the loop. Boiler water, which may be admitted from a suitable outside source, is conducted via line 83 through variable flow boiler water pump 86 and thence via line 85 into loop 87. Water may be discharge from loop 87 via bleed line 89 to be utilized elsewhere. Utilization of boiler water heating is optional and may be used when there is a proximate need for heating outside the system. For example, when there are portions of other proximate spaces or proximate treatment or processing systems which require heat, the boiler water heating feature may be added as shown in FIG. 2. It has been observed that when boiler water heating is employed, it is generally the first priority to be engaged when cooling by heat exchanger 280 is required.

Various sensors are included in conditioning system 250. Temperature sensor 52 is installed in line 29 to sense hydrolyzed sludge temperature, T1, as the sludge enters conditioning system 250. Temperature sensor 54 is installed in line 63 to sense the temperature, T2, of the hydrolyzed sludge as it is directed to digester 120. Temperature sensor 62 is located in bleed line 89 to sense the temperature, T5, of the loop 87 water. Temperature sensor 64 is located in line 95 to sense the temperature, T6, of the heated wastewater discharged from heat exchanger 280B. Flow sensors 66, 68, and 76 are installed to sense the flow rates of conditioned hydrolyzed sludge, F1, into digester 120, steam generator feed water, F2, from treatment unit 260, and dilution water, F3, through line 71, respectively. Additionally, the speed, Hz14, of pump 14 is a system variable as is the pressure drop $\Delta P = P1 - P2$.

The sensors described above provide system variable data that may be used to monitor and control system 100, and particularly sub-system 200, by means of the various variable flow pumps and valves discussed above. The general object of the control approach is to deliver hydrolyzed sludge to digester 120 such that the sludge is at or near specified temperature and percent dry solids levels. These levels are selectable based on knowledge of the makeup of the raw sludge and other environmental conditions. In the implementation of the control system, various set point values—some of which are referenced above, are established. For purposes of describing the control system, symbols for the system variables and associated set points are listed in Table I. Table II provides typical values of selected set points and constants.

TABLE I

System Variables and Setpoints

| Variable | Setpoint |
|---|---|
| F1 | F1SET |
| F2 | F2SET |
| F3 | F3SET |
| Hz14 | Hz14SET |
| P1 | P1SET |
| P2 | P2SET |
| $\Delta P$ | $\Delta$PSET |
| P3 | P3SET |
| T1 | T1SET |
| T2 | T2SET1, T2SET2 |
| T3 | T3SET |
| T4 | T4SET |
| T5 | T5SET |
| T6 | T6SET |

TABLE II

Typical Values for Selected Setpoints and Constants

| Set point or Constant | Typical Value |
|---|---|
| F3SET | F1 × (1 − DSOUT/DSIN) − F2 |
| $\Delta$PSET | 4 bar |
| P3SET | $T3^4 \times 10^{-8} + 1$ |
| T1SET | 100° C. |
| T2SET1 | 43° C. |
| T2SET2 | 50° C. |
| T3SET | 165° C. |
| T5SET | 45° C. |
| DSOUT | 10% |
| DSIN | 25% |

TABLE II-continued

Typical Values for Selected Setpoints and Constants

| Set point or Constant | Typical Value |
|---|---|
| K2T2 | 60 seconds |
| K2T3 | 60 seconds |
| K4T2 | 60 seconds |
| K5T2 | 60 seconds |
| K6T2 | 60 seconds |
| Kt | 2 hours |
| K1T2 | 60 seconds |
| K3T2 | 60 seconds |
| K3T3 | 60 seconds |
| K7T2 | 60 seconds |

For a description of the processes involved in controlling system 100, it may be instructive to consider a typical process situation in which dewatered sludge from hopper 12 is to be treated. For purposes of illustration an embodiment wherein startup management includes controlling partitioning of dewatered sludge flow between heat exchanger 216 and reactor 214 will be described. The dewatered sludge, as noted above, may include dry solids in a range of 20%-30% (by weight), and the temperature of the sludge may be in a range of about 5° to about 40° C. An objective of the treatment is to deliver a generally continuous flow of hydrolyzed sludge at 30°-60° C. and 6%-14% (by weight) dry solids to anaerobic digester 120. As discussed above, an initial or start-up stage or mode of the treatment process is needed to establish the process. To begin the startup mode, valves 18 and 20 are driven fully open by the control system and pump 88 is activated to run at its minimum speed as described above. Sludge pump 56 is energized and operated to pump liquid from digester 120 into system 100 to pressure set the system. The liquid pumped from digester 120 for pressure setting the system may be from an initial charge of the digester with water or sludge, the initial charge having been heated in the digester. It is well known to charge digesters with liquid and heat the liquid before admitting hydrolyzed sludge for digestion and production of biogas. Steam injection into reactor 214 is commenced at a minimal level. As discussed above, pump 88 is maintained in operation with a minimum flow (even when the rest of the system is not running) in order to prevent pitting corrosion in the heat exchanger. When T3 is approaching the setpoint, $T_{3SET}$, pump 14 is started along with pump 72 to commence admission of dewatered sludge and to activate the dilution water system. Pump 14 is then operated continuously at a minimum speed until the entire system is heated up and T2 is close to $T_{2SET}$. Thereafter the speed Hz14 of pump 14 is allowed to regulate up to its setpoint, Hz14SET. Likewise, valve V4 may be used as needed to control the admission of steam into reactor 214. Control of steam admission to reactor 214 is based on a desired operating temperature, T3SET, in the reactor and the actual reactor temperature, T3, as sensed by temperature sensor 50.

The incoming dewatered sludge may be quite viscous due to both the relatively low raw sludge temperature and the concentration of dry solids contained therein. During start-up, due to the viscosity of the entering sludge, most or a majority of the incoming dewatered sludge bypasses heat exchanger 216 and flows into hydrolysis reactor 214, with a smaller portion of the raw sludge flowing to the heat exchanger. As hot hydrolyzed sludge flows from reactor 214 into heat exchanger 216, the smaller portion of the entering dewatered sludge passing through the heat exchanger is warmed. This causes the flow resistance through heat exchanger tubes 219 to gradually decrease, gradually reducing the difference in pressures, ΔP, sensed by sensors 16 and 22, and gradually decreasing the bypass flow of sludge in favor of flow through the heat exchanger tubes 219. As ΔP gradually reduces, valve 18 (V1) is gradually closed such that when ΔP reaches an acceptable level the valve is fully closed to produce a generally steady state condition where all or substantially all entering dewatered sludge passes through heat exchanger 216 before entering reactor 214. In this way, a part of the heat added in hydrolysis is recovered and used to warm, or preheat, the incoming dewatered sludge. In the process, the hydrolyzed sludge is partially cooled before entering conditioning system 250. In a typical generally steady state condition, the temperature of the sludge just prior to mixing with steam from steam generator 212 is about 85° C.-110° C. This is a result of the incoming sludge being heated by the heat exchanger 216. The hydrolyzed sludge leaves hydrolysis reactor 214 at about 140-165° C., about 10 bar, and about 17-27% dry solids. The sludge temperature, T1, is decreased to about 80°-110° C. as it enters the conditioning system 250.

Injection of dilution water may further reduce the temperature of the hydrolyzed sludge as well as reduce the solids concentration in the hydrolyzed sludge. Dilution water may be directed via valve 74 to dilute the sludge in lines 29 and 63 via lines 77 and 75, respectively. Pump 72, activated when pump 14 is activated, is regulated based on T2 relative to T2SET and based on F3 relative to F3SET. Valve 74 is regulated based on the T1 relative to T1SET. When T1 is below T1SET, dilution water is not admitted through line 77 to line 29. Rather, all dilution water under this condition is admitted via line 75 to line 63. Under another condition, when T1 is above T1SET, valve 74 may be actuated to direct more dilution water through line 77 to line 29 until T1 drops below T1SET. The rate of flow of dilution water, F3, into the system is controlled based on the dry solids concentration in hopper 12, a desired dry solids concentration of hydrolyzed conditioned sludge being directed to digester 120, a measured flow rate (F1) of sludge to the digester, and a damped average value of the measured flow rate of water (F2) to steam generator 212. Dilution water pump 72 is regulated based on controlling F3 relative to F3SET.

Injection of dilution water into line 29 may also reduce the sludge temperature as it enters heat exchanger 270, if required, to about 100° C. Preheating, in heat exchanger 270, of the feed water for steam generator 212 may also cool the hydrolyzed sludge. For example, when heat exchanger 270 is used, the treated water provided via line 53 may be at about 8° C., and in heating the wastewater the sludge temperature may drop to about 70°-90° C. When the sludge has passed heat exchanger 280A, which is not yet active on the secondary side, additional dilution water may be added through line 75 if required. The temperature, $T_2$, of the diluted sludge increases during start-up, and when $T_2$ reaches its T2SET within a given margin the start-up phase can be considered completed and the system shifts to normal operation. During normal operation $T_2$ is controlled relative to T2SET by regulation of valve 20 (V2). Pump 86, pump 82, and pump 88 are likewise regulated based on $T_2$ relative to T2SET. When steady state operation results in hydrolyzed sludge in line 59 having a temperature near the low end of the 70°-90° C. range, or about 70° C., the further cooling need is generally accomplished by dilution alone. Accordingly, in such cases, pumps 82 and 86 are stopped, and pump 88 is reduced, if needed, to the minimal speed required to prevent corrosion of surfaces of heat exchanger unit 280B while the unit is not being used to cool sludge. When steady state operation results in T1 being near the high end of the approximate 70°-90° C. range, or about 90° C., sufficient cooling of the sludge cannot generally be efficiently accomplished by dilution alone. In this case, pump 86 may be energized to provide boiler water at about 40° C. to loop 87 of heat exchanger unit 280, and pump 88 may be regulated based on T6 relative to T6SET to provide the necessary flow of treated wastewater for additional cooling, resulting in a decrease to about 70° C. in hydrolyzed sludge temperature as the sludge passes through heat exchanger 280A. The temperature may be further reduced to about 40° C. by dilution as described above. At sludge temperatures within the 70°-90° C. range, the heat removal rate or cooling by heat exchange unit 280 may be modulated by control of pumps 82, 86, and 88 informed by T2, T5, and T6 relative to their respective set points T2SET, T5SET, and T6SET.

As discussed above, in one embodiment the dilution water may be heated and injected to heat the hydrolyzed sludge prior to the sludge being directed to digester 120. Doing so may be advantageous under certain very cold startup and operating conditions where high levels of bypassing of incoming sludge around heat exchanger 212 might result is reduced efficiency of operation. It is appreciated that the control process can be straightforwardly modified by one of skill in control technology to effect this embodiment as an optional feature of system 100.

It is appreciated that not all heated sludge from hydrolysis may need to be used to pre-heat incoming sludge. An optional automatically controlled bypass line may be incorporated to allow heated sludge to be used downstream in connection with dilution if required by digester 120 and not attainable by methods described above.

Figure 4A:
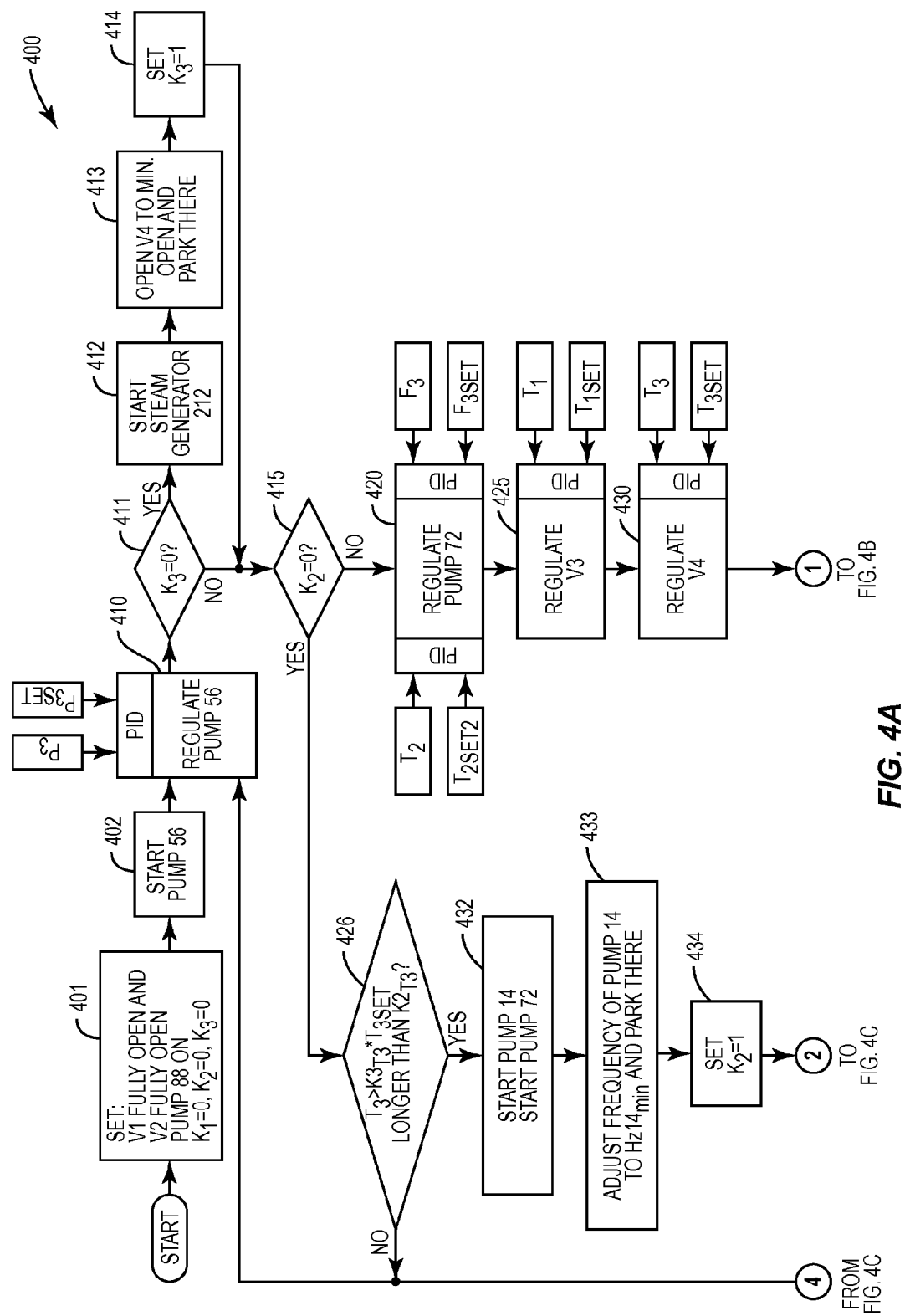
FIG. 4A is a first portion of a system control logic diagram for an exemplary embodiment of a control system for the sludge hydrolysis and conditioning system for anaerobic digestion.
Figure 4B:
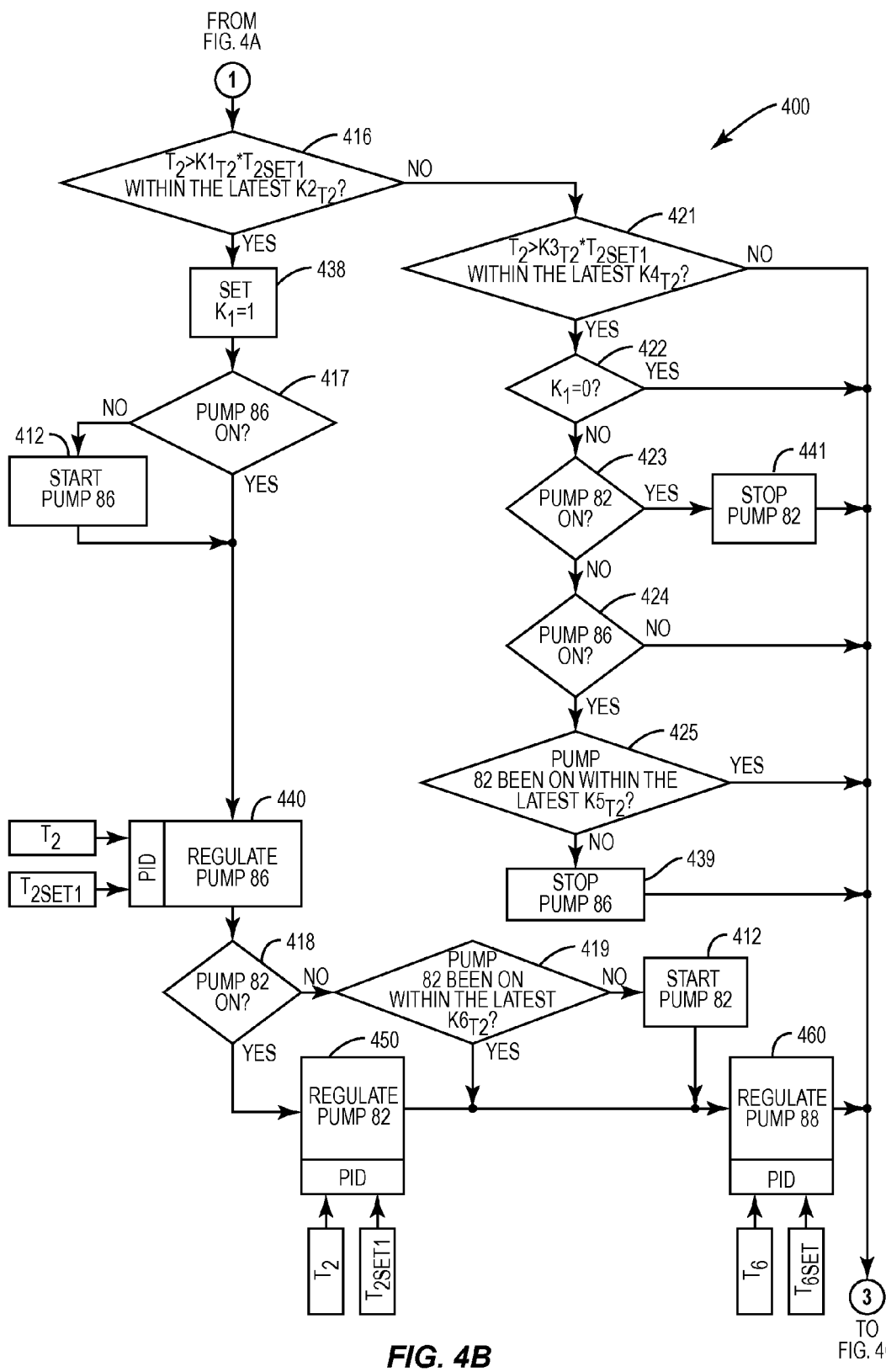
FIG. 4B is a second portion of the system control logic diagram for an exemplary embodiment of a control system for the sludge hydrolysis and conditioning system for anaerobic digestion.
Figure 4C:
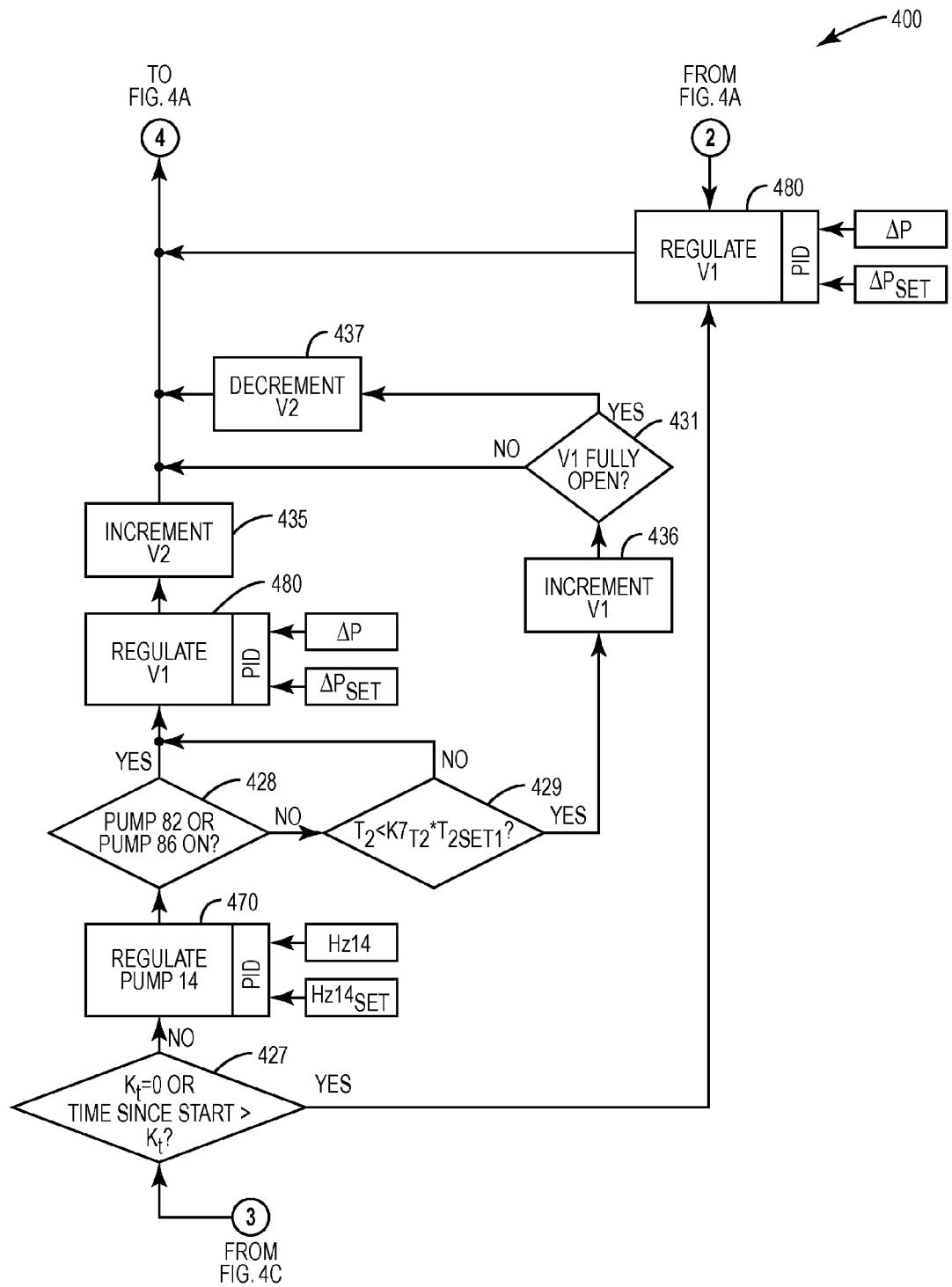
FIG. 4C is a third portion of the system control logic diagram for an exemplary embodiment of a control system for the sludge hydrolysis and conditioning system for anaerobic digestion.

One embodiment of a control system is illustrated in FIGS. 4A, 4B, and 4C, and the control system logic is indicated generally by the numeral 400. This embodiment implements startup management by controlling the partitioning of dewatered sludge flow between heat exchanger 216 and reactor 214. Control system logic 400 implements PID controls of pumps and valves as those of ordinary skill in control system design will appreciate. A series of status indicators and constants, selected based on general operating conditions and objectives as will be commonly appreciated, are included in control system 400. Status indicators K1, K2, and K3 are set to 0 or 1 to indicate the status of regulation of various valves and pumps. Constants $K2_{T2}$, $K2_{T3}$, $K4_{T2}$, $K5_{T2}$, and $K6_{T2}$ are time values which are utilized to provide a time period during which a particular comparison criterion is assessed. These constants may have values near unity, either slightly above or slightly below 1 enable stable operation in view of tests of various system variables relative to their respective set points. The constant $K_t$ is likewise a time value utilized in testing whether an event does not occur in a set time period to determine whether an element of the system require regulation. These time values may each be typically about 2 seconds. Constants $K1_{T2}$, $K3_{T2}$, $K3_{T3}$ and $K7_{T2}$ enable performing an event before a set point is fully reached, or delaying an event until a set point has been exceeded by a given margin. These latter constants are dimensionless quantities each typically being about 1 or more particularly having a value that may be from about 0.96 to about 1.04. The status indicators and constants thus provide signaling and support control system stability. Further, those of skill in the art will appreciate how these constants are deployed in system 400 to avoid motors stopping and starting many times with short intervals and the thermal cycling that can occur in cases of such short intervals. An additional constant, Hz14 min, is employed to establish a minimum operating speed of pump 14 to ensure continuous in feed of sludge.

Accordingly, system 400 includes nine PID regulators, indicated in FIGS. 4A, 4B, and 4C by the numerals 410, 420, 425, 430, 440, 450, 460, 470, and 480. Each of these PID regulators regulates either a pump or a valve based one or more system variables and their respective set point values. It is appreciated that PID regulator 480 appears in two virtual places in FIG. 4C, yet it is one regulator. The placement is utilized to simplify the diagram. As an example, regulator 410 controls the speed and direction of pump 56. It will be remembered from the discussion above, that during the startup mode of the system, pump 86 may actually pump in a reverse direction to pump sludge from digester 120 to pressure set the system. As observed in FIG. 4A, PID regulator 410 controls pump 56 based on P1 relative to P1SET. Similarly, as another example, PID regulator 480 controls the state of valve 18 (V1) based on ΔP relative to ΔPSET. As appreciated by those of ordinary skill in the use of PID regulators or controllers, tuning of the relative weights of proportional, integral, and differential control is generally needed and may be accomplished according any of several known procedures.

While PID control of valves 18 and 20 (V1 and V2) might be accomplished entirely with PID controllers, the nature the present system makes it practicable to use a combination of PID and incremental control. The incremental control is shown at blocks 435, 436, and 437. Indeed, only incremental control is called for in the case of valve 20 (V2). V2 is regulated by incrementing at block 435 under to condition as indicated by decision blocks 411, 415, 416, 417, 418, 419, 421, 422, 423, 424, 425, 427, 428, and 429 having a particular set of output control signals. Likewise, V2 is regulated at block 437 by decrementing as indicated by the same decision chain but when the decision at block 429 is different from the case when incrementing of V2 occurs and when decision block 431 determines the valve 18 (V1) is fully open.

From the above discussion, it is apparent that system logic 300 includes a series of decision blocks, including in addition to those referred to above, decision block 426. Each decision block implements a particular choice of control action steps based on a criterion announced in the block applied to a particular control variable value. For example, decision block 426 answers the question: "Has T3 been above the temperature T3SET multiplied by K3T3 for a time longer than K2T3?" Answering this question effectively determines whether the temperature of reactor 214 is getting close to the desired value. If T3 is close to T3SET, pumps 14 and 72 are started as indicated in control action block 432 and the control steps through blocks 433, 434, and 480 back to block 410. If T3 is not sufficiently close to T3SET, pumps 14 and 72 are not started. Rather control passes back to block 410.

From the foregoing discussion it is apparent that logic 300 includes, in additions to the PID regulators or controllers, a series of control action blocks. These include blocks 401, 402, 412, 413, 414, 438, 439, 441 among others. As an example, control action block 432 is discussed above. As another example, control action block 414 sets the status indicator K3 to the value 1 to indicate that steam generator 212 has been started. As appreciated to those skilled in the art, logic 300 may be understood in the context of a program operating on a computer interfaced with the physical elements represented by the blocks in the logic diagram. Such interfacing permits the computer to command, for example, to increment a motor associated with valve 20 (V2) to increment or decrement the valve. Further, the program operates in a digital loop, stepping through the logic in repeated cycles. In each step, the logic directs actions based on the decisions reached at each decision block as it is reached in a cycle. Such decisions direct the course of program steps along different branches of the logic based on the decisions at each point. The repeating of the control cycle repeats continuously so long as the system is operated. From FIGS. 4A, B, and C, is it appreciated that one can consider a control loop commencing at block 410 and tracing through the logic according to decisions at decision blocks encountered with the cycle ended by control passing back to block 410 from whence the next cycle begins.

It is appreciated that alternative embodiments exist representing various approaches to controlling sludge temperature within the scope of the present invention. One embodiment, as discussed above, includes preheating dilution water as an alternative sludge temperature control approach. Using well known control system modifications, the logic of FIGS. 4A, 4C, and 4C may be configured to implement this alternative control strategy.

The present invention, then, provides a control system and process for continuously treating dewatered sludge using hydrolysis with a series of cooling and diluting sub-processes to provide hydrolyzed sludge at an optimum temperature and dry solids content to support effective anaerobic digestion of the sludge. Application of control approaches as disclosed herein provide for controlling the hydrolyzed sludge at the optimum temperature. Anaerobic digestion, when efficiently operated with such a control system, provides a source of fuel as biogas. The present invention may, of course, be carried out in other ways than those specifically set forth herein without departing from essential characteristics of the invention. The present embodiments are to be considered in all respects as illustrative and not restrictive, and all changes coming within the meaning and equivalency range of the appended claims are intended to be embraced therein.

What is claimed is:

1. A method for treating sludge comprising:
   (a) dewatering the sludge;
   (b) directing the dewatered sludge to a generally vertically oriented heat exchanger, the heat exchanger having a sludge inlet placed at a lower portion of the heat exchanger, a sludge outlet placed at an upper portion of the heat exchanger, a hydrolyzed sludge inlet placed at an upper portion of the heat exchanger, and a hydrolyzed sludge outlet placed at a lower portion of the heat exchanger;
   (c) directing the dewatered sludge into the sludge inlet and upwardly through the heat exchanger and out the sludge outlet and into a hydrolysis reactor;
   (d) hydrolyzing the dewatered sludge in the hydrolysis reactor;
   (e) passing the hydrolyzed sludge into the hydrolyzed sludge inlet of the heat exchanger;
   (f) providing sludge-to-sludge heat transfer by directing the hydrolyzed sludge downward through the heat exchanger as the dewatered sludge moves upward and through the heat exchanger;
   (g) directing the hydrolyzed sludge out the hydrolyzed sludge outlet of the heat exchanger to an anaerobic digester; and
   (h) anaerobically digesting the hydrolyzed sludge in the anaerobic digester.

2. The method of claim 1 including directing at least a portion of the dewatered sludge around the heat exchanger and to the hydrolysis reactor without the dewatered sludge passing through the heat exchanger.

3. The method of claim 1 including directing at least a portion of the dewatered sludge around the heat exchanger and to the hydrolysis reactor to increase the temperature of the hydrolyzed sludge entering the anaerobic digester.

4. The method of claim 1 including directing dilution water into the hydrolyzed sludge to adjust a proportion of dry matter in the sludge.

5. The method of claim 1 including directing dilution water into the hydrolyzed sludge to cool the hydrolyzed sludge.

6. The method of claim 1 including heating dilution water and directing the heated dilution water into the hydrolyzed sludge to heat the hydrolyzed sludge.

7. The method of claim 6 wherein the heated dilution water is directed into the hydrolyzed sludge during a startup period in the method.

8. The method of claim 1, wherein the heat exchanger includes a cylinder, including directing the hydrolyzed sludge into a top portion of the cylinder and downwardly through the cylinder; and directing the dewatered sludge upwardly through a series of spaced apart conduits extending through the cylinder so as to give rise to sludge-to-sludge heat transfer as heat is transferred from the hydrolyzed sludge passing through the cylinder to the dewatered sludge passing upwardly through the conduits in the cylinder.

9. The method of claim 1 including,
   cooling the hydrolyzed sludge upstream of the anaerobic digester by directing the hydrolyzed sludge through one or more additional heat exchangers disposed upstream of the anaerobic digester; and
   reducing the dry solids concentration of the hydrolyzed sludge by mixing dilution water with the hydrolyzed sludge at a point between the hydrolysis reactor and the anaerobic digester.

10. The method of claim 1 including heating the hydrolysis reactor with steam produced by a steam generator; and directing steam generator feed water and hydrolyzed sludge to a heat exchanger disposed downstream of the hydrolysis reactor and reducing the temperature of the hydrolyzed sludge by transferring heat from the hydrolyzed sludge to the steam generator feed water.

11. The method of claim 1 wherein the heat exchanger is tilted from vertical to increase heat transfer from the hydrolyzed sludge to the dewatered sludge.

12. The method of claim 11 wherein the heat exchanger is tilted about 15° relative to vertical to prevent the formation of boundary layers in the hydrolyzed sludge about tubes disposed within the heat exchanger that conduct the dewatered sludge through the heat exchanger.

13. The method of claim 1 wherein the heat exchanger includes an air pocket disposed in a top portion of the heat exchanger for absorbing pressure surges.

14. The method of claim 1 wherein the hydrolysis reactor includes a vent system for venting non-condensable gases from the hydrolysis reactor.

15. A method of treating sludge comprising:
    (a) dewatering the sludge;
    (b) directing the dewatered sludge to a hydrolysis reactor and hydrolyzing the dewatered sludge;
    (c) directing the hydrolyzed sludge to an anaerobic digester;
    (d) anaerobically digesting the hydrolyzed sludge;

(e) providing a heat exchanger on the outlet side of the hydrolysis reactor for heating at least a portion of the dewatered sludge prior to the dewatered sludge entering the hydrolysis reactor wherein the heat exchanger provides for sludge-to-sludge heat transfer between the hydrolyzed sludge and the dewatered sludge;

(f) varying the flow of the dewatered sludge through the heat exchanger during certain periods of sludge treatment by:
   (i) during a startup mode directing at least a part of the dewatered sludge through a heat exchanger bypass line and to the hydrolysis reactor; and
   (ii) during a steady state mode, directing a majority of the dewatered sludge through the heat exchanger and then to the hydrolysis reactor.

16. The method of claim 15, including during an initial portion of the startup mode, directing substantially all the dewatered sludge through the heat exchanger bypass line to the hydrolysis reactor.

17. The method of claim 16, after the initial portion of the start-up mode, increasing over time the flow of dewatered sludge through the heat exchanger and decreasing the flow of dewatered sludge through the heat exchanger bypass line during the startup mode.

18. The method of claim 15, further including during a selected period of the steady state mode, directing substantially all of the dewatered sludge through the heat exchanger prior to reaching the hydrolysis reactor.

19. The method of claim 15, including during the steady state mode, increasing the temperature of the hydrolyzed sludge directed to the anaerobic digester by decreasing the flow of dewatered sludge through the heat exchanger and increasing the flow of dewatered sludge through the heat exchange bypass line.

20. The method of claim 15 including directing dilution water into hydrolyzed sludge for adjusting a proportion of dry matter in the sludge.

21. The method of claim 20 wherein directing dilution water into the hydrolyzed sludge includes cooling the hydrolyzed sludge due to the dilution water.

22. The method of claim 15 including directing dilution water into the hydrolyzed sludge for adjusting a temperature of the sludge or for adjusting a dry matter proportion of the sludge.

23. The method of claim 22 wherein directing the dilution water into the hydrolyzed sludge includes heating the dilution water before directing the dilution water into the sludge and heating the sludge with the heated dilution water.

* * * * *